May 24, 1955 J. C. MOERK 2,708,851
MOTOR GEAR ASSEMBLY

Filed Jan. 30, 1952 2 Sheets-Sheet 1

INVENTOR.
JOHN C. MOERK
BY
Paul L. Krohn
ATTORNEY

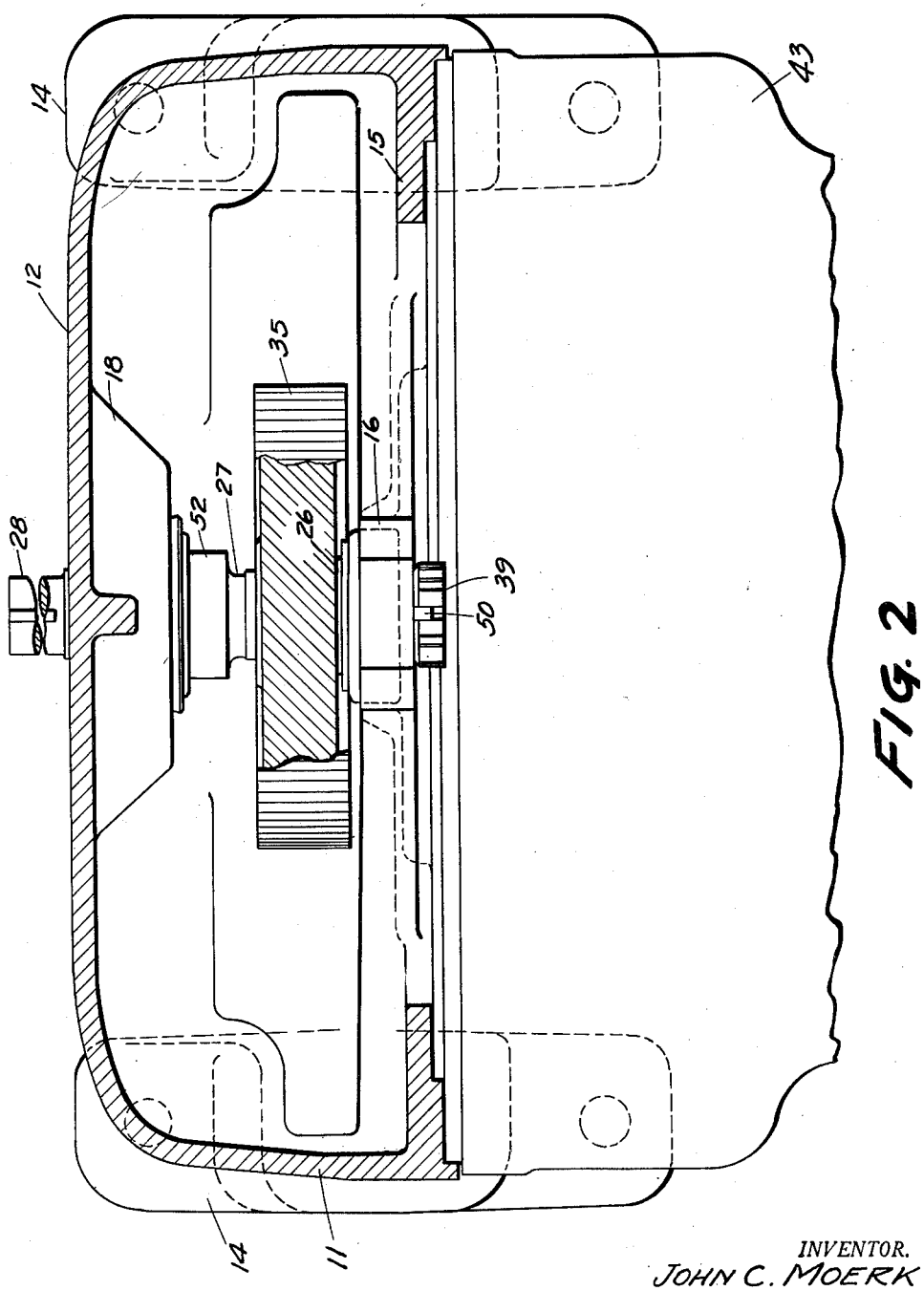

United States Patent Office 2,708,851
Patented May 24, 1955

2,708,851

MOTOR GEAR ASSEMBLY

John C. Moerk, Freeport, Ill., assignor to Fairbanks, Morse & Co., Chicago, Ill., a corporation of Illinois Application January 30, 1952, Serial No. 269,071

1 Claim. (Cl. 74—421)

This invention relates to improvements in motor-gear structures, and more particularly to an improved motor-gear assembly embodying improvements in the construction and manner of assembly of the gear unit.

An object of the invention resides in the provision of a motor-driven reduction gear assembly of a construction to afford ready access to gear, shaft and bearing parts, whereby to greatly facilitate assembly and disassembly of the parts.

Another object is to provide a motor-gear assembly of the character indicated, which is economical of manufacture and assembly of its parts, and which affords an improved shaft mounting of the reduction gear.

Other objects and advantages of the present invention will appear from the following description of a presently preferred embodiment thereof exemplified in the accompanying drawing, wherein:

Fig. 2 is an enlarged horizontal sectional view of the gear unit, as taken along the line 2—2 in Fig. 1.

Figure 1:
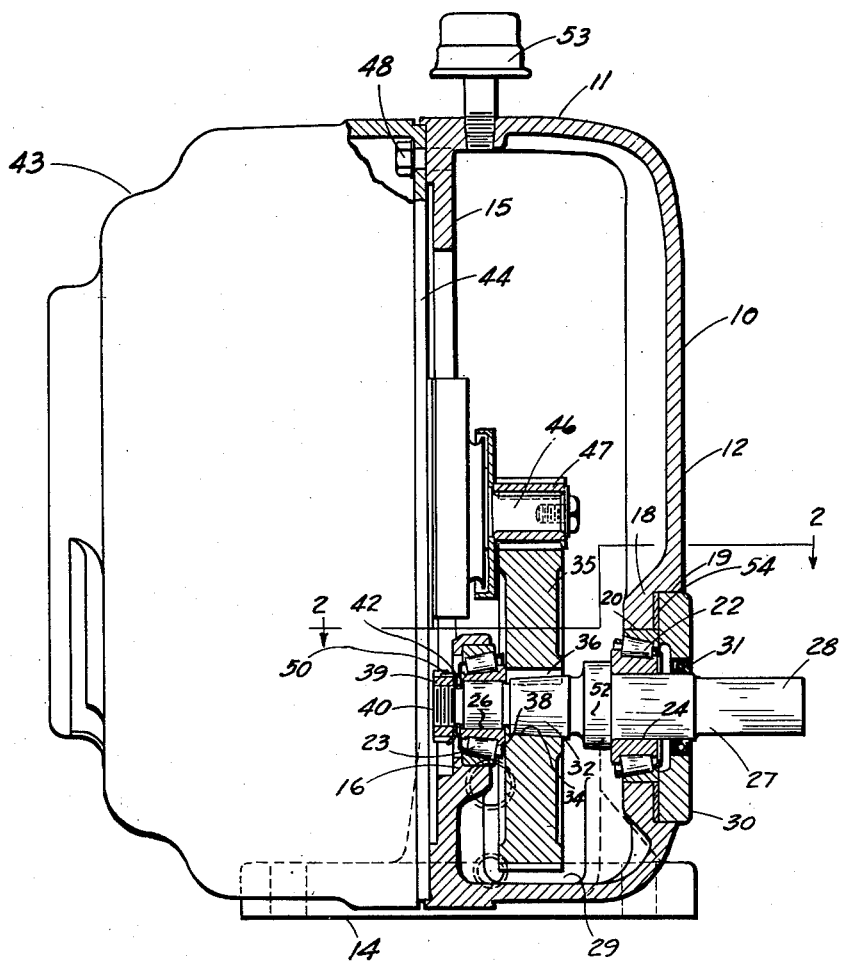
Fig. 1 illustrates the improved motor-gear assembly, with the gear housing and gearing therein shown in longitudinal vertical section.

Referring to the drawing, the presently improved motor-driven reduction gear assembly includes a unitary or one-piece gear housing or casing 10 providing a circumferential wall 11, a closure wall 12 for one side of the casing, and supporting feet or mounting flanges 14 through which the assembly may be mounted on a suitable base (not shown). The side of the casing opposite the closure wall 12, is open but for an inwardly projecting peripheral flange 15 provided for a purpose to appear.

In the lower portion of the housing 10 and formed integrally with the flange 15, is an apertured bearing boss or bracket support 16 upstanding from the flange within the housing. The closure wall 12 in the lower portion thereof opposite the bracket or bearing support 16, is formed to provide an internal bearing boss 18 recessed at 19 and providing a bearing aperture 20 in axial alignment with the aperture of boss 16. Received in the aperture 20 of boss 18 is a suitable shaft supporting bearing 22 here shown to be of a friction-reducing roller bearing type, while similarly received in the aperture of bearing boss 16 is an anti-friction bearing 23 which also may be of roller type as shown. Supported by the inner bearing races 24 and 26 of the respective bearings 22 and 23 is an output shaft 27, the shaft projecting outwardly beyond the casing wall 12 as at 28, for power take-off. In shaft assembly to the casing, the bearing boss opening 20 and bearing 22 therein are sealed against dust, dirt and the like, and also against loss of lubricating oil from the casing sump 29, by a closure member 30 suitably retained in the boss recess 19 and having a shaft seal provision, as at 31.

The shaft portion 32 within the casing and between the bearings 22 and 23, is formed to present a cylindrical, longitudinally tapered seat for wedge-reception in the correspondingly tapered hub bore 34 of a gear member 35. A suitable key element 36 serves to provide a positive shaft-driven connection between gear 35 and the shaft 27.

As clearly illustrated in the drawing, the assembly location of the shaft seat 32 and gear 35 thereon in the casing, is such that the gear hub portion 38 normally is in abutment with one end of the inner race member 26 of bearing 23. Advantage is taken of this arrangement by utilizing a shaft assembly retaining nut 39 in threaded engagement on the shaft end 40 and abutting the opposite end of bearing race 26 as through a suitable washer 42, to effect a firm wedge-seating of the shaft seat 32 in the hub bore of gear 35. It will appear that upon take-up of the nut 39, the latter acting through the bearing race 26 in abutment with the gear hub 38, will cause relative axial displacement of the shaft and gear, to result in firm frictional seating of the shaft seat 32 in the gear hub bore 34. It thus will appear that by this provision, relative wedging displacement of the gear and shaft is easily effected without producing any strain on the roller elements of the bearing 23.

The motor part 43 of the present assembly, provides a mounting base 44 and has the motor armature shaft 46 projecting outwardly beyond the base side of the motor. In driven securement on the armature shaft 46 is a pinion 47 for driving engagement with the gear 35. In assembly, the motor 43 is supported on the casing 10 in a position to close the open side of the casing and with the motor base portion 44 in seating engagement with the casing flange 15. A plurality of securing elements such as bolts 48 (only one being shown), are provided for motor securement to the flange 15. In such mounted position of the motor on the frame 10, the motor shaft 46 will be disposed within casing 10 with the pinion 47 in driving engagement with gear 35.

With the motor 43 removed, it will appear that the shaft and its bearings, together with gear 35, are readily accessible through the open side of the gear casing 10. Thus assembly of the parts is thereby greatly facilitated, and is accomplished in the following manner. As a first step, the bearing 23 is seated in proper position in bearing boss 16. Whereupon, the gear 35 is introduced through the open side of gear casing 10 and is held in vertical position between the bearing bosses. Shaft 27 preferably having the bearing 22 mounted thereon in position to locate its inner race 24 in firm contact with shaft flange 52, then is projected into the casing through the aperture 20 of boss 18, with its inner end portion passed through the hub bore 34 of gear 35 and into mounted relation with the inner race 26 of bearing 23. As the shaft is so inserted, the bearing 22 is thereby seated in the boss aperture 20. Now upon application of washer 42 and clamping nut 39 to the end 40 of shaft 27, the nut may be drawn up to effect through abutment of the gear hub 38 and bearing race 26, relative axial displacement of the shaft and gear in the direction such as to produce shaft displacement to bring the tapered shaft seat 32 into firm frictional seating in the gear hub bore 34. Thereupon, the nut 39 may be locked to the shaft as by a suitable locking element 50. With application of the closure member 30 in the recess 19 of boss 18, the gear unit is then ready for mounting of the motor 43 as above described.

From the foregoing, it will appear now that the present gear unit affords an assembly in which the shaft, bearings and gear elements are readily accessible through the open side of the gear housing 10, whereby to facilitate the manner of assembly of these parts as aforesaid, as well as to enable ready disassembly of the parts. The open side of the casing moreover, does not require a separate closure member apart from the motor base portion 44, as the latter serves this purpose. Also, casing 10 may be vented as through the use of a suitable filter vent 53 of well known type, mounted in the top portion of the casing. It is to be noted further, that one or more suitable shims 54 may be disposed in the boss recess 19 beneath the closure member 30, for the purpose of adjusting the position of the outer race of bearing 22 in the bearing aperture 20. Through such adjustment the relative axial spacing of the outer races of bearings 22 and 23 may be determined to result in a desirable running clearance of the roller elements of the bearings.

Having now described a presently preferred embodiment of the invention, what is desired to be claimed and secured by Letters Patent is:

A gear unit for a motor-gear assembly, comprising a one-piece gear casing open at one side and including a closure wall at its opposite side, an apertured bearing support integral with the casing at its open side, said closure wall providing a bearing boss having an aperture therethrough and in axial alignment with the aperture of said bearing support, an output shaft arranged in the casing with one end extending through said apertured bearing support and its opposite end portion projecting through the aperture of said bearing boss and outwardly of the casing, the shaft having a flange thereon, a first shaft-supporting anti-friction type bearing having its outer race in the aperture of said bearing boss and providing an inner race on the shaft in engagement with said shaft flange, a second shaft supporting anti-friction type bearing mounted in the aperture of said bearing support and having an inner race sleeved on the shaft, said shaft providing a cylindrical, longitudinally tapered seat portion between said shaft flange and the shaft portion on which the inner race of said second shaft bearing is sleeved, a gear providing a tapered hub-bore receiving said seat portion of the shaft in frictional engagement therein and having the gear hub thereof in abutment with said inner race of said second shaft bearing, a drive key element between said gear hub and the shaft in said seat portion thereof, means including a threaded element threadedly received on said one end of the shaft, operable for effecting axial displacement of the shaft relative to said gear such as to effect firm frictional engagement of said shaft seat portion in said gear hub bore, and adjustment means carried by said closure wall and effective for determining the position of the outer race of said first bearing axially in the aperture of said bearing boss.

References Cited in the file of this patent
UNITED STATES PATENTS

| | | |
|---|---|---|
| 1,104,243 | Brown | July 21, 1914 |
| 2,036,389 | Bannan | Apr. 7, 1936 |
| 2,192,856 | Nenninger | Mar. 5, 1940 |
| 2,221,315 | Okun | Nov. 12, 1940 |